United States Patent
King et al.

(10) Patent No.: US 9,102,389 B2
(45) Date of Patent: Aug. 11, 2015

(54) WHEEL SUSPENSION AND RETRACTION APPARATUS

(75) Inventors: Jonathan Austin King, Warwickshire (GB); Neil Graham Jenkins, Warwickshire (GB)

(73) Assignee: Gibbs Technologies Ltd., Warwickshire (GB)

( * ) Notice: Subject to any disclaimer, the term of this patent is extended or adjusted under 35 U.S.C. 154(b) by 219 days.

(21) Appl. No.: 12/522,417

(22) PCT Filed: Jan. 15, 2008

(86) PCT No.: PCT/GB2008/000127
§ 371 (c)(1),
(2), (4) Date: Jan. 5, 2010

(87) PCT Pub. No.: WO2008/087393
PCT Pub. Date: Jul. 24, 2008

(65) Prior Publication Data
US 2010/0136858 A1    Jun. 3, 2010

(30) Foreign Application Priority Data
Jan. 15, 2007  (GB) .................................. 0700766.9

(51) Int. Cl.
*B60F 3/00* (2006.01)
*B63C 13/00* (2006.01)
(52) U.S. Cl.
CPC ................. *B63C 13/00* (2013.01); *B60F 3/003* (2013.01); *B60F 2301/04* (2013.01)
(58) Field of Classification Search
USPC ................................... 440/12.5, 12.52, 12.66
IPC ............................................ B60F 3/00,2301/00
See application file for complete search history.

(56) References Cited

U.S. PATENT DOCUMENTS 3,280,785 A  10/1966  Mycroft
3,421,472 A   1/1969  Oberg
(Continued)

FOREIGN PATENT DOCUMENTS

GB    2134052 B   7/1986
WO    9400332 A1  1/1994
(Continued)

OTHER PUBLICATIONS

International Search Report, Jul. 1, 2009, 2 pages, from PCT/GB2008/000127, published as WO2008087393 on Aug. 13, 2009.

*Primary Examiner* — Stephen Avila
(74) *Attorney, Agent, or Firm* — Fulwider Patton LLP

(57) ABSTRACT

A wheel suspension and retraction apparatus (2) for an amphibious vehicle comprises a suspension unit having transverse upper and lower suspension links (4, 8); spring and damper unit (12), and suspension upright (6) supporting wheel (10), and pivotally connected to outboard ends of links (4 and 8). The wheel retraction mechanism has a retraction linkage (14, 16, 18), pivotally connectable to the vehicle, and an actuator (38) for moving the wheel suspension between a protracted position for land use and a retracted position for use on water. The retraction mechanism supports the suspension unit spaced apart transversely from the vehicle. Tie bar (16) is connected to upper retraction arm (14) at an intermediate location (30) to ensure a large angle of tilt on retraction, to ensure that the wheel is retracted above hull line (156). The wheel suspension does not have to be compressed on retraction.

27 Claims, 4 Drawing Sheets

(56) References Cited

U.S. PATENT DOCUMENTS

| | | | |
|---|---|---|---|
| 3,755,838 A | 9/1973 | Dunagan | |
| 4,241,686 A | 12/1980 | Westphalen | |
| 4,958,584 A | 9/1990 | Williamson | |
| 5,531,179 A * | 7/1996 | Roycroft et al. | 440/12.5 |
| 5,562,066 A | 10/1996 | Gere et al. | |
| 5,755,173 A | 5/1998 | Rorabaugh et al. | |
| RE36,901 E | 10/2000 | Roycroft | |
| 6,159,058 A | 12/2000 | Matheson et al. | |
| 6,505,694 B2 | 1/2003 | Maguire | |
| 6,811,454 B2 | 11/2004 | Royle | |
| 6,945,832 B2 * | 9/2005 | Roycroft | 440/12.52 |

FOREIGN PATENT DOCUMENTS

| | | |
|---|---|---|
| WO | 9523074 A1 | 8/1995 |
| WO | 9942311 A2 | 8/1999 |
| WO | 0216152 A1 | 2/2002 |
| WO | 0244006 A1 | 6/2002 |
| WO | 02087908 A1 | 11/2002 |
| WO | 03035416 A1 | 5/2003 |
| WO | 2008087393 A2 | 7/2008 |

* cited by examiner

WHEEL SUSPENSION AND RETRACTION APPARATUS

RELATED APPLICATIONS

This application is a U.S. national phase of PCT/GB2008/000127, filed Jan. 15, 2008, which claims priority from Great Britain Application Serial No. 0700766.9, filed Jan. 15, 2007.

The present invention relates' to a wheel suspension and retraction apparatus for an amphibious vehicle, and to an amphibious vehicle having such a wheel suspension and retraction apparatus. In particular, it relates to apparatus which functions as suspension for a wheel when the vehicle is on land and which allows retraction of the wheel above a waterline of an amphibious vehicle.

Many amphibious vehicles have been designed with wheel retraction mechanisms, to lift the wheels when the vehicle is on water. Many of the wheel retraction systems are complicated and/or provide poor suspension when the vehicle is used on land.

U.S. Pat. No. 5,755,173 describes use for each wheel of a transversely-extending single arm which swings upwardly around a longitudinal axis of the vehicle. This results in compromised suspension on land, as there is too much camber change on bump and on rebound.

WO02/16152 describes a trailing arm suspension. This gives zero camber change to the wheel when one side of the car loads up during cornering. This provides for poor road holding when on land. U.S. Pat. No. 3,755,838 also describes a trailing arm suspension. This again provides poor road holding on land.

The present invention provides, in a first aspect, a wheel suspension and retraction apparatus for an amphibious vehicle comprising a suspension unit having a transversely extending upper suspension link, a transversely extending lower suspension link and a suspension upright for supporting a wheel, said suspension upright pivotally connected to, in use, outboard ends of the upper and lower suspension links. A wheel retraction mechanism having a retraction linkage pivotally connectable to the vehicle and an actuator for pivoting the retraction linkage between, in use, a protracted position and a retracted position. The retraction mechanism supports, in use, the suspension unit spaced apart transversely from the vehicle with the suspension unit supported on the vehicle only via the retraction mechanism. When the retraction linkage is protracted then the retraction linkage holds the suspension unit in a deployed wheel position for operation of the vehicle on land, and on retraction, in use, the retraction mechanism lifts the suspension unit upwardly to a retracted wheel position, for use of the vehicle on water.

The present invention provides, in a second aspect, a wheel suspension and retraction apparatus for an amphibious vehicle comprising a suspension unit having a transversely extending upper suspension link, a transversely extending lower suspension link and a suspension upright for supporting a wheel, said suspension upright pivotally connected to outboard ends of the upper and lower suspension links. A wheel retraction mechanism having a retraction linkage pivotally connectable to the vehicle and an actuator for pivoting the retraction linkage between, in use, a protracted position and a retracted position. The retraction linkage comprises a lower retraction link pivotally connected at, in use, an outboard end thereof to the lower suspension link and pivotally connectable at an inboard end thereof to the vehicle. When the lower retraction link is protracted the retraction linkage holds the suspension unit in a deployed wheel position for operation of the vehicle on land, and on retraction, the retraction mechanism lifts the suspension unit upwardly to a retracted wheel position, for use of the vehicle on water.

Thus, the wheels can be retracted using a relatively simple mechanism. While on land the suspension provides good road holding ability. Standard parts may be used for several of the key components, reducing design and manufacturing costs.

Embodiments of the present invention will now be described, by way of example only, with reference to the accompanying drawings, in which.

Figure 1:
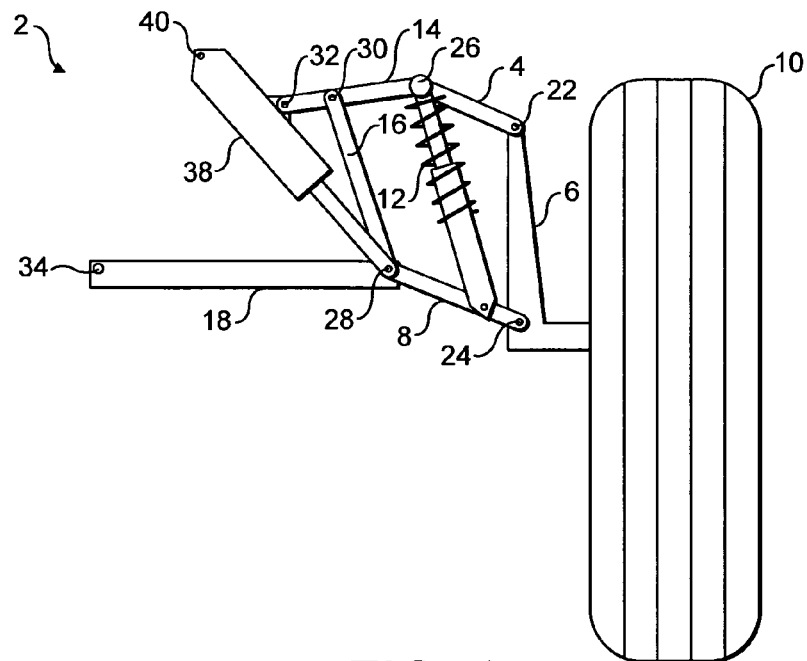
FIG. 1 is a schematic side elevation of the wheel retraction apparatus of the present invention, in a fully extended state.

FIG. 1 shows a wheel retraction apparatus 2 fitted with a wheel 10, for use on an amphibious vehicle. The amphibious vehicle (not shown) is a buoyant vessel, having wheels including wheel 10. The amphibious vehicle includes a motor, for example a petrol or diesel internal combustion engine. One or more of the wheels 10 will be driven by the motor on land. The motor may also provide power to a marine propulsion unit, for propelling the vehicle on water. The wheel retraction apparatus 2 according to the present invention can be used for steerable wheels or non-steerable wheels, and for driven wheels or non-driven wheels, but for the sake of simplicity is shown for a non-steered non-driven wheel 10.

The amphibious vehicle can operate on land in a land mode, and switch to a water mode in which it can be used on water. The amphibious vehicle is able to plane on the water in the water mode.

FIG. 1 shows the wheel 10 rotatably connected to a suspension upright 6 (sometimes called a knuckle or a hub carrier). The suspension upright 6 has a top end rotatably connected to an upper suspension link 4 by a pivot 22. A bottom end of the suspension upright 6 is rotatably connected to a lower suspension link 8 by a pivot 24. The upper suspension link 4 and the lower suspension link 8 extend transversely of the vehicle, inwardly from the suspension upright 6, i.e. closer to a centre line of the vehicle.

The upper suspension link 4 and lower suspension link 8 are preferably each wishbone-shaped arms with the apex of each arm connected to the suspension upright 6. The upper suspension link 4 is shorter than the lower suspension link 8.

In the figure there can be seen a spring-and-damper unit 12 which is preferably a conventional spring-over-damper unit as illustrated. The spring-and-damper unit 12 is pivotally connected at its top end to an inboard end of the upper suspension link. The spring-and-damper unit 12 is connected at its bottom end to lower suspension link 8, nearer to the outboard pivot 24 than to an inboard pivot 28 of the lower suspension link.

The upper and lower suspension links 4, 8, the suspension upright 6 and the spring-and-damper unit 12 together form a double wishbone suspension unit. Double wishbone suspension units are well known in use in road-going vehicles and provide good levels of road holding ability. The use of a conventional geometry double wishbone suspension allows off the shelf components to be readily used, reducing design and manufacturing costs for the amphibious vehicle. The ride handling characteristics of this layout are well known, and so can be adapted or tuned to the specific requirements of the vehicle, in order to provide a comfortable ride and/or good cornering capabilities.

The double wishbone suspension unit is not directly connected to the vehicle body. The suspension unit is secured to the vehicle and spaced apart from the vehicle by a retraction mechanism. The retraction mechanism has a retraction linkage which can rigidly support the suspension unit in a protracted position to allow the suspension unit to function when the vehicle is on land. The retraction mechanism is further operable to retract the suspension unit when the vehicle is on water.

The retraction mechanism will now be described with reference to FIG. 1. The retraction mechanism comprises upper retraction arms 14 (only one shown in the figure, but these will be a pair of longitudinally-spaced apart arms), lower retraction arms 18 (only one shown in the figure, but there will be a pair of longitudinally spaced-apart arms) and a tie bar or bars 16. The bifurcated inboard ends of the upper suspension link 4 are pivotally connected one each to the upper retraction arms 14 by a pair of pivots 26 (only one shown). Inboard ends of the upper retraction arms 14 are pivotally connected to the vehicle body by a pair of spaced-apart pivots 32.

The bifurcated ends of the lower suspension link 8 are pivotally connected one each to the lower retraction arms 18 by a pair of pivots 28. Inboard ends of the lower retraction arms 18 are pivotally connected to the vehicle body by a pair of pivots 34.

The tie bar or bars 16 has/have a lower end(s) pivotally connected to outboard ends of the lower retraction arms 18 and lower suspension link 8 at the pair of pivots 28. An upper end/upper ends of the tie bar(s) 16 is/are pivotally connected to the upper retraction arms 14 at a pair of pivots 30.

Pivots 22, 24, 26, 28, 30, 32, 34 all allow relative rotational movement of the attached members in the same plane or parallel planes. The pivots 22, 24, 26, 28, 30, 32, 34 allow rotation about axes each substantially parallel to the longitudinal axis of the vehicle. This allows vertical movement of the wheel 10 and also provides for tilting of the wheel about an axis parallel to the longitudinal axis of the vehicle, as will be described in more detail.

The upper retraction arms 14 and lower retraction arms 18 each comprise two arms. The separation of the arms may be uniform along their length, or the separation of the arms may reduce towards their outboard ends or in any other manner.

The upper retraction arms 14 and/or lower retraction arms 18 may each be formed as an "H" frame. This may reduce uneven loading of the arms, and increase rigidity. This also improves the dimensional consistency of the suspension.

An actuator 38 is provided in the retraction mechanism, in order to effect protraction and retraction of the retraction mechanism during mode change and also to hold the retraction mechanism stationary at all other times. The actuator 38 is in the form of a hydraulic ram. The hydraulic ram 38 has an outboard end rotatably attached to the outboard end of a lower retraction arm 18 (or to both outboard ends of the lower retraction arms 18) by the pivot 28. The outboard end of the ram 38 is rotatably attached to the vehicle body by a pivot 40. The wheel 10 is therefore secured to the vehicle at five points: two pivots 32, two pivots 34 and one pivot 40. The retraction mechanism is configured to withstand the forces experienced by the wheel 10.

Operation of the wheel retraction mechanism will now be described. When the vehicle is in a land mode, the wheel retraction apparatus is in a fully protracted state as shown in FIG. 1, in which the wheel 10 is in contact with a road or other ground. The hydraulic ram 38 is extended and locked in position when the vehicle is in the land mode.

Figure 2:
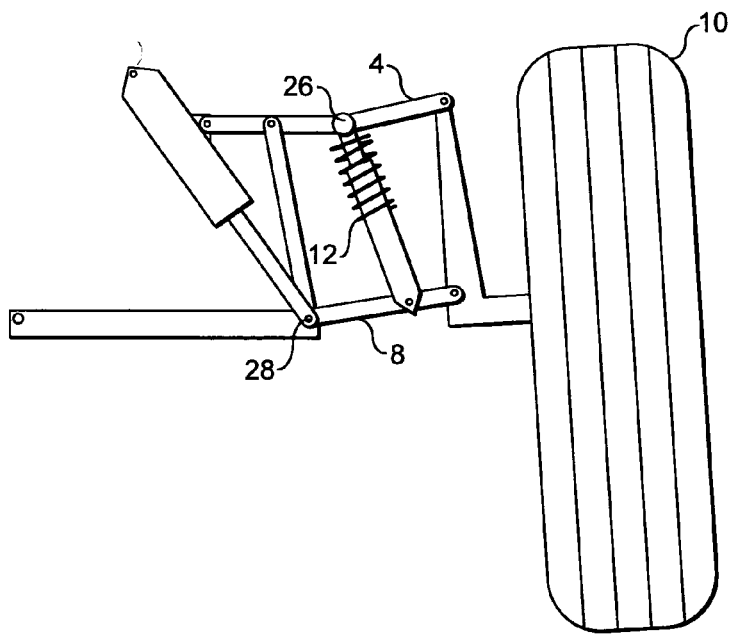
FIG. 2 is a schematic side elevation of the wheel retraction apparatus of the present invention showing limited bump travel.

As the vehicle is driven, the double wishbone suspension unit will absorb bumps in the road. FIG. 2 shows the retraction apparatus in part bump travel. The retraction mechanism remains locked in place, providing fixed inboard pivot points for the double wishbone suspension unit. The wheel 10 has been urged upwardly by the bump in the road. Upper suspension link 4 and lower suspension link 8 have rotated upwardly about pivots 26, 28 respectively. Upper suspension link 4 is shorter than lower suspension link 8, so that the upward movement of the wheel results in a small camber change of the wheel 10 towards an inboard side of the vehicle, 6 as this aids road holding. The spring-and-damper unit 12 is partially compressed during part bump travel, and resists the upward movement of the wheel 10 to keep the wheel 10 in contact with the road.

During part bump travel the upper retraction arms 14, lower retraction arms 18 and tie bars 16 are locked stationary, and the function of the double wishbone suspension unit is not substantially affected by the ability of the apparatus to retract.

Figure 3:
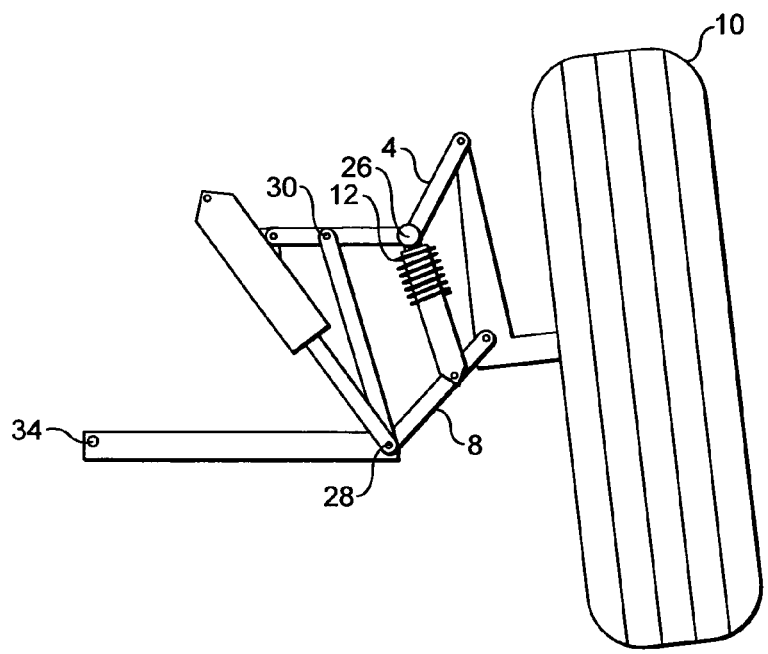
FIG. 3 is a schematic side elevation of the wheel retraction apparatus of the present invention showing full bump travel.

FIG. 3 shows the wheel retraction apparatus in full bump travel. This shows the maximum intended rotation of the upper and lower suspension links 4, 8. As for FIG. 2, the wheel retraction mechanism is locked to provide stationary pivots 26, 28 for the double wishbone suspension unit.

Figure 4:
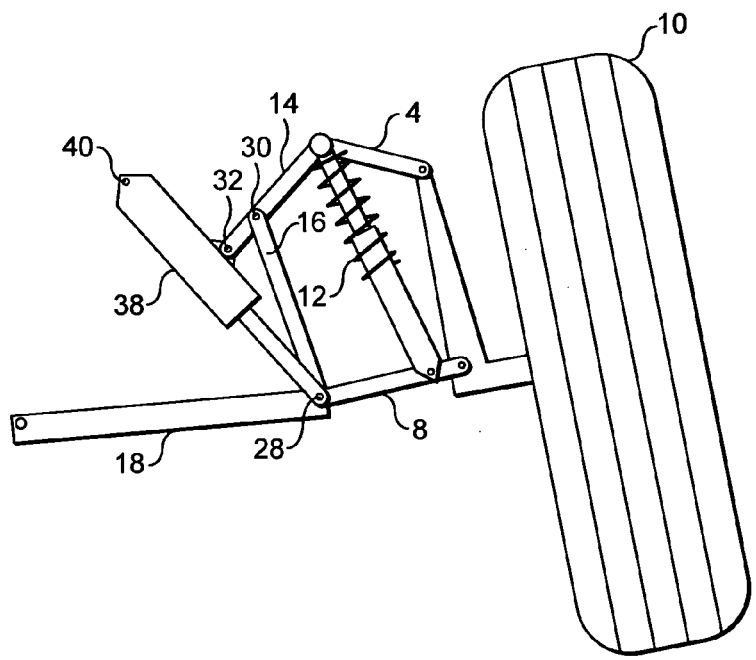
FIG. 4 is a schematic side elevation of the wheel retraction apparatus of the present invention in a partially retracted state.

The retraction of the wheel 10, will now be described with reference to FIG. 4. The retraction is actuated by contraction of the hydraulic ram 38. Since the hydraulic ram 38 is securely attached to the vehicle by pivot 40, the retraction urges pivots 28 generally towards pivot 40. The pivots 28 are therefore lifted upwardly and inboard. Lower retraction arms 18 rotate upwardly about pivots 34. The tie bar(s) 16 move upwardly, with its/their upper end(s) at pivot(s) 30 defining an arc around pivot(s) 32. The movement of the tie bar(s) 16 causes the upper retraction arms 14 to rotate upwardly around pivots 32.

Due to the arrangement of the retraction links in the wheel retraction mechanism, the upper retraction arms 14 undergo a larger angle of rotation than the lower retraction arms 18. In particular, this is because pivots 30 are relatively close to pivots 32. Thus, a first angle of rotation of pivot 28 about pivot 34, when the hydraulic ram contracts, causes a larger second angle of rotation of the upper retraction arms 14 about pivots 32. The lower retraction arms 18 are longer than the distance between pivots 30 and 32, and so the linear contraction of the hydraulic ram 38 results in a smaller angle of rotation of the lower retraction arms 18. The long length of the lower retraction arms 18 also provides for long vertical travel of the double wishbone suspension unit, allowing the wheel 10 to be retracted above the waterline of a deep V-hull amphibious vehicle.

The rotation of the upper retraction arms 14 and lower retraction arms 18 carries the upper suspension link 4 and lower suspension link 8 upwardly. Initially, the movement of the wheel 10 is substantially as if it is rotated around pivot 34. The spring-and-damper unit 12 tends to expand as the weight of the vehicle is taken off the wheel 10. The expansion of the spring-and-damper unit 12 is limited by a rebound stop (not shown) and reaches a maximum.

Figure 5:
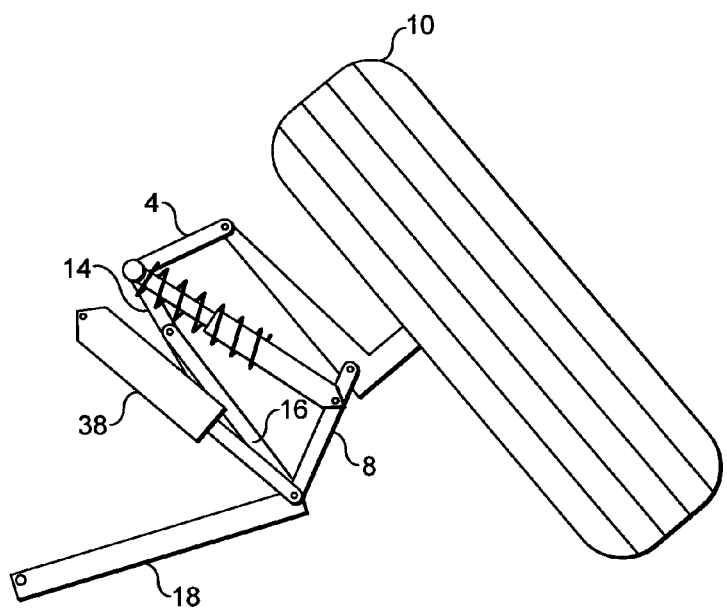
FIG. 5 is a schematic side elevation view of the wheel retraction apparatus in a fully retracted state.

FIG. 5 shows the wheel retraction apparatus when the wheel 10 is fully retracted. The wheel 10 is lifted a significant distance upwardly. The wheel 10 has also been rotated in an inboard direction, anti-clockwise about pivot 28 as shown in FIG. 5. The wheel 10 has been rotated from the vertical by an angle larger than the rotation of the lower retraction arms 18. The additional rotation of the wheel 10 is provided by the greater rotation of the upper retraction arms 14 than the lower retraction arms 18.

When the wheel 10 is fully retracted, the wheel 10 is above a waterline of the vehicle, even when a vehicle is cornering. The vehicle is able to plane on water without drag caused by the wheel 10.

The retraction mechanism is also operable to protract the suspension unit from a retracted position into the state shown in FIG. 1. The wheel retraction apparatus has a good lifting capability in the event that the vehicle is beached, i.e. if the vehicle is run aground then the wheels can be extended to contact a solid bed in shallow water and lift the vehicle upwards. Since the rotational axis of the wheels is close to parallel to the ground during the final stages of deployment the amount of tyre scrub in deployment is kept low.

Figure 6:
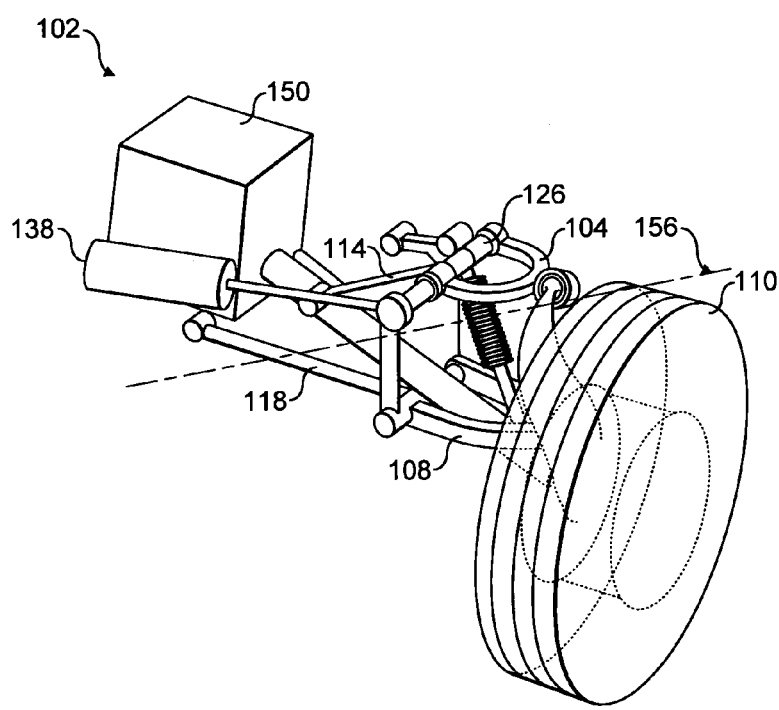
FIG. 6 is a perspective view of a second embodiment of the present invention in which the wheel retraction apparatus is in a fully extended state.
Figure 7:
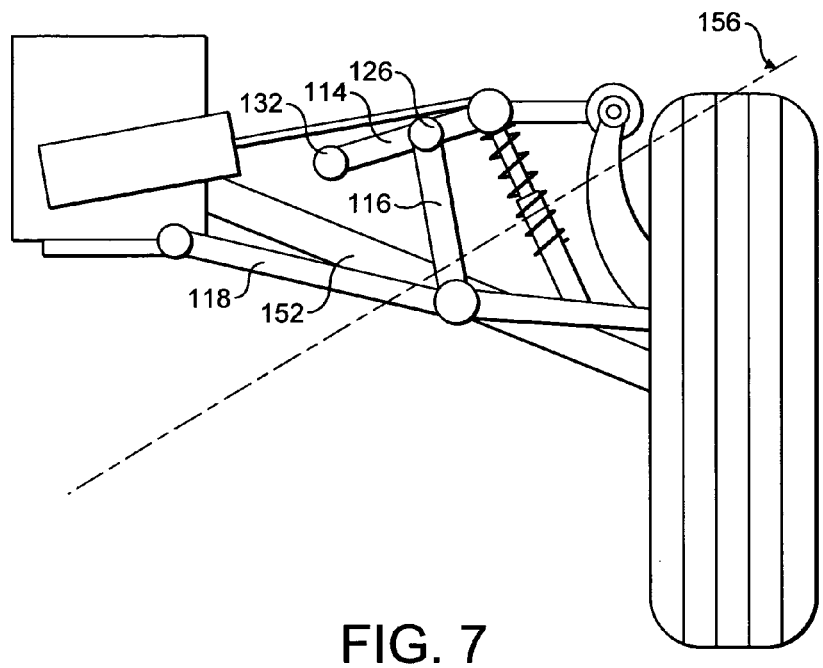
FIG. 7 is a side elevation view of the extended wheel retraction apparatus of FIG. 6.
Figure 8:
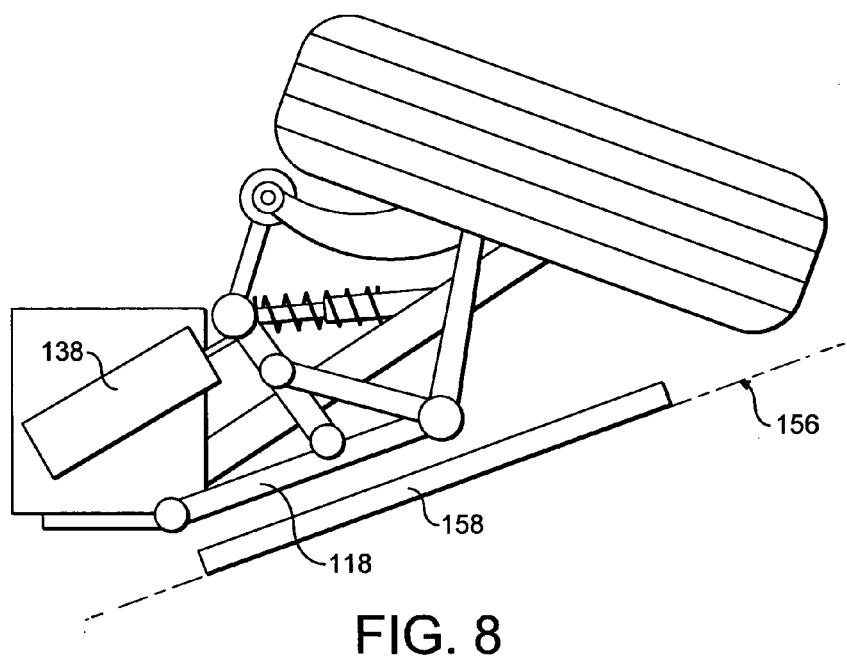
FIG. 8 is a side elevation view of the wheel retraction apparatus of FIG. 6 in a fully retracted state.

FIGS. 6 to 8 show a second embodiment 102 of the wheel suspension and retraction apparatus. The most significant difference from the first embodiment is the location and orientation of the hydraulic ram 138. The hydraulic ram 138 is pivotally connected to a pivot 126 connecting an upper retraction arm 114 to bifurcated inboard ends of the upper suspension link 104. In order for wheel 110 to be retracted, the hydraulic ram 138 contracts, urging pivot 126 in an inward and upward direction, and rotating it in an anti-clockwise direction as shown, about an inboard pivot 132. This movement causes the lower retraction arms 118 to rotate upwardly. As for the first embodiment, this results in the wheel 110 being lifted upwardly and tilting in an anti-clockwise direction (as shown) to raise it clear of the water line of the vehicle. FIG. 8 shows a fully retracted position.

FIG. 8 also indicates a hull line of the vehicle as line 156. The hull has a recess in which the wheel retraction apparatus is located. A closing panel 158 is movably locatable over the aperture once the wheel is retracted. The panel 158 can be attached to the lower retraction arm 118. The hull, panel or closing mechanism may be as described in US 2006/0189224 which is incorporated herein by reference.

FIGS. 6 to 8 show a driven wheel. A part of the drive train, for example a differential 150, is shown. A drive shaft 152 connects the differential 150 to the wheel 110 via universal joints (not shown) in a known manner.

The drive shaft 152 and closing panel 158 can also be used in the first embodiment of the present invention. A steering arm may be connected to the suspension upright to steer wheels 10. The steering arm will retract with the suspension unit.

It should be noted that further refinements may be made to the apparatus described above without departing from the essential inventive concept. For example, actuator 38 may be powered by electricity; magnetic drive; compressed gas; vacuum drive; a mechanical drive from a power take off; or by any other suitable means.

The suspension unit has been described as being supported on the vehicle only via the retraction mechanism. This is intended to indicate that the retraction mechanism is substantially the only load bearing connection supporting the suspension unit. The suspension unit may have further connections to the vehicle, for example steering tie rods, anti-roll bars, drive shafts or hydraulic hoses. Such devices are not considered to bear a substantial part of the weight and loads of the suspension unit.

The invention claimed is:

1. A wheel suspension and retraction apparatus for an amphibious vehicle comprising:
    a suspension unit having a transversely extending upper suspension link, a transversely extending lower suspension link and a suspension upright for supporting a wheel, said suspension upright pivotally connected to, in use, outboard ends of the upper and lower suspension links;
    a wheel retraction mechanism having a retraction linkage pivotally connectable to the vehicle and an actuator for pivoting the retraction linkage between, in use, a protracted position and a retracted position; wherein:
    the retraction mechanism supports, in use, the suspension unit spaced apart transversely from the vehicle with the suspension unit supported on the vehicle only via the retraction mechanism;
    wherein when the retraction linkage is protracted then the retraction linkage holds the suspension unit in a deployed wheel position for operation of the vehicle on land; and
    on retraction, in use, the retraction mechanism lifts the suspension unit upwardly to a retracted wheel position, for use of the vehicle on water.

2. The wheel suspension and retraction apparatus of claim 1, wherein in use the retraction linkage is pivotally attached to an inboard end of the upper suspension link and to an inboard end of the lower suspension link.

3. The wheel suspension and retraction apparatus of claim 1 wherein in use the retraction mechanism is operable to rotate the suspension unit upwardly and in an inboard direction.

4. The wheel suspension and retraction apparatus of claim 3 wherein the retraction mechanism is operable to tilt the suspension upright whilst lifting the suspension unit.

5. The wheel suspension and retraction apparatus as claimed in claim 1 wherein the retraction linkage comprises:
    an upper retraction link pivotally connected at an outboard end thereof to the upper suspension link and pivotally connectable at an inboard end thereof to the vehicle,
    a lower retraction link pivotally connected at an outboard end thereof to the lower suspension link and pivotally connectable at an inboard end thereof to the vehicle; and
    a tie bar pivotally connected between the upper retraction arm and the lower retraction arm.

6. The wheel suspension and retraction apparatus of claim 5 wherein the tie bar is pivotally connected to the upper retraction link at a point on the upper retraction link between inboard and outboard ends of the upper retraction link.

7. The wheel suspension and retraction mechanism of claim 5 wherein the tie bar is pivotally connected to the lower retraction link at the outboard end thereof.

8. The wheel suspension and retraction apparatus of claim 5 wherein the lower retraction link is longer than the upper retraction link.

9. The wheel suspension and retraction apparatus as claimed in claim 5 wherein the actuator is a hydraulic ram pivotally connected at an outboard end thereof to the lower retraction link and pivotally connectable at an inboard end thereof to the vehicle.

10. The wheel suspension and retraction apparatus of claim 5 wherein the actuator is a hydraulic ram pivotally connected at an outboard end thereof to the upper retraction link and pivotally connectable at an inboard end thereof to the vehicle.

11. The wheel suspension and retraction apparatus of claim 1 wherein the upper suspension link is shorter than the lower suspension link.

12. The wheel suspension and retraction apparatus of claim 1 wherein the upper suspension link and/or the lower suspension link are each in the form of a wishbone.

13. A wheel suspension and retraction apparatus for an amphibious vehicle comprising:
   a suspension unit having a transversely extending upper suspension link, a transversely extending lower suspension link and a suspension upright for supporting a wheel, said suspension upright pivotally connected to outboard ends of the upper and lower suspension links;
   a wheel retraction mechanism having a retraction linkage pivotally connectable to the vehicle and an actuator for pivoting the retraction linkage between, in use, a protracted position and a retracted position;
   wherein the retraction linkage comprises a lower retraction link pivotally connected at, in use, an outboard end thereof to the lower suspension link and pivotally connectable at an inboard end thereof to the vehicle;
   wherein when the lower retraction link is protracted the retraction linkage holds the suspension unit in a deployed wheel position for operation of the vehicle on land; and
   on retraction, the retraction mechanism lifts the suspension unit upwardly to a retracted wheel position, for use of the vehicle on water.

14. A wheel suspension and retraction apparatus as claimed in claim 13, wherein the retraction linkage is pivotally attached to an inboard end of the upper suspension link and to an inboard end of the lower suspension link.

15. The wheel suspension and retraction apparatus of claim 13 wherein the retraction mechanism is operable to rotate the suspension unit upwardly and in an inboard direction.

16. The wheel suspension and retraction apparatus of claim 13 wherein the retraction mechanism is operable to tilt the suspension upright whilst lifting the suspension unit.

17. The wheel suspension and retraction apparatus as claimed in claim 13 wherein the retraction linkage further comprises an upper retraction link pivotally connected at an outboard end thereof to the upper suspension link and pivotally connectable at an inboard end thereof to the vehicle, and
   a tie bar pivotally connected between the upper retraction link and the lower retraction link.

18. The wheel suspension and retraction apparatus of claim 17 wherein the tie bar is pivotally connected to the upper retraction link at a point on the upper retraction link between inboard and outboard ends of the upper retraction link.

19. The wheel suspension and retraction mechanism of claim 17 wherein the tie bar is pivotally connected to the lower retraction link at the outboard end thereof.

20. The wheel suspension and retraction apparatus of claim 17 wherein the lower retraction link is longer than the upper retraction link.

21. The wheel suspension and retraction apparatus as claimed in claim 13 wherein the actuator is a hydraulic ram pivotally connected at an outboard end thereof to the lower retraction link and pivotally connectable at an inboard end thereof to the vehicle.

22. The wheel suspension and retraction apparatus of claim 17 wherein the actuator is a hydraulic ram pivotally connected at an outboard end thereof to the upper retraction link and pivotally connectable at an inboard end thereof to the vehicle.

23. The wheel suspension and retraction apparatus of claim 13 wherein the upper suspension link is shorter than the lower suspension link.

24. The wheel suspension and retraction apparatus of claim 13 wherein the upper suspension link and/or the lower suspension link are each in the form of a wishbone.

25. The wheel suspension and retraction apparatus of claim 17 wherein the lower retraction link and/or the upper retraction link are formed as a pair of rigid members.

26. The wheel suspension and retraction mechanism of claim 17 wherein the upper retraction link and/or the lower retraction link is/are each configured as an "H" frame.

27. An amphibious vehicle having the wheel suspension and retraction apparatus of claim 1.

* * * * *